United States Patent Office 2,904,504
Patented Sept. 15, 1959

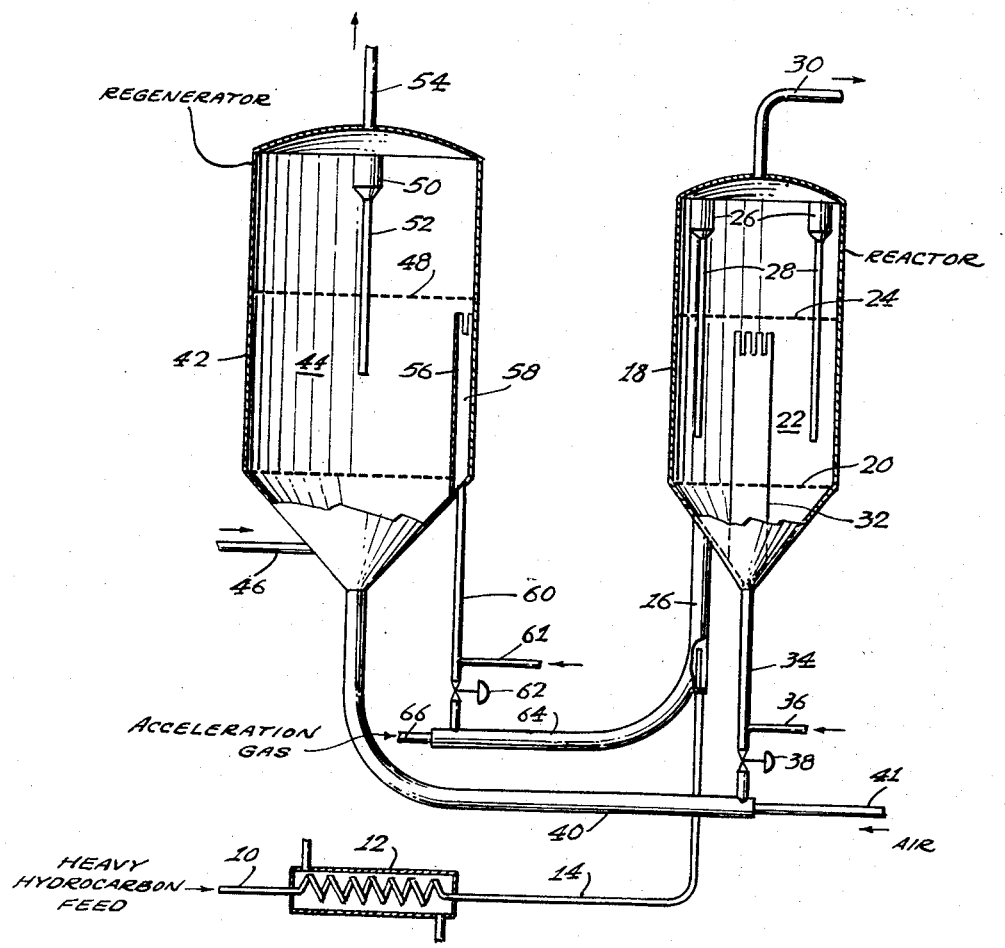

2,904,504

METHOD FOR CHARGING HIGH-BOILING HYDROCARBONS TO FLUID CATALYTIC CONVERSION PROCESSES

Theodore Rice, Verona, Pa., assignor to Gulf Research & Development Company, Pittsburgh, Pa., a corporation of Delaware Application December 22, 1954, Serial No. 476,908

2 Claims. (Cl. 208—157)

This invention relates to a process for the catalytic conversion of hydrocarbons and more particularly to a method of charging a high boiling point heavy hydrocarbon charge stock in a fluidized catalytic process.

In fluid catalytic processes for the conversion of hydrocarbons the charge stock to be converted is passed upwardly through a fluid bed of catalyst in a reactor in which the charge stock comes in intimate contact with the catalyst. The fluid bed consists of a dense phase of finely divided catalyst particles suspended in a hindered settling state by the ascending charge stocks and gaseous reaction products. The fluid bed has a well defined upper surface above which is a dilute phase of gaseous reaction products and entrained catalyst particles. Fluidized catalyt beds are characterized by a high degree of turbulence which results in substantially uniform temperatures and catalyst distribution throughout the bed.

During the course of the conversion reaction the catalyst becomes contaminated with carbonaceous deposits and is transferred to a regenerator in which the catalyst is maintained in a fluidized bed by ascending oxygen-containing gases which burn carbonaceous deposits from the catalyst. The heat of combustion of the carbonaceous deposits raises the temperature of the catalyst particles substantially and provides a means for supplying heat to the conversion reaction as the catalyst particles are recycled to the reactor for further use. The regenerated catalyst is withdrawn from the regenerator through a standpipe and discharged into a transfer line in which the catalyst is mixed with, and transported by, the charge stock fed to the reactor.

The usual charge stock in fluid catalytic hydrocarbon conversion processes is a distillate fraction which is charged to the fluid system as a gas or is quickly vaporized on contact with the hot catalyst. The increased demand for products from fluid catalytic conversion proceses has led to the use of increasingly heavier distillate fractions as charge stocks for the processes. It is desirable in order to increase still further the amount of charge stock available from any given crude for use in the conversion processes to provide a process in which residual materials, for example, full or reduced crude oils, can be successfully used as charge stocks.

The use of heavy hydrocarbons and particularly of residual fractions as charge stocks to fluidized processes creates several difficult problems. The very high boiling points of the heavy hydrocarbons are in many instances above the temperatures employed in conversion processes. If the charge stock is heated to temperatures high enough to cause substantial vaporization of the charge stock, coking in the preheater results. On the other hand, if the heavy hydrocarbon charge stock is not vaporized prior to introduction into the system, and substantial quantities of liquid are present, the catalyst particles become overloaded with the liquid and agglomerate with adjacent particles in the transfer line prior to conversion or adsorption of the liquid by the catalyst. The agglomerates cause coking and plugging of the transfer line making it necessary to shut down operations. In addition, the agglomerates also are detrimental to fluidization in the reactor.

This invention resides in a process for charging heavy hydrocarbons of high boiling point into a fluid process for the conversion of the hydrocarbons by introducing substantial quantities of gas into a stream of the hot finely divided solid particles to disperse, and impart a high velocity to, the particles, and then mixing the dispersed solids with the heavy hydrocarbon feed stock to form a dilute phase of solid particles suspended in gases which is delivered through a transfer line into a reactor in which a fluid bed of the solid particles is maintained.

The single figure of the drawings is a diagrammatic flow sheet of apparatus suitable for charging heavy hydrocarbons to a fluidized catalytic conversion process according to the method of this invention.

This invention can be used for charging a heavy hydrocarbon charge stock at least partially in the liquid phase into any fluidized process for the conversion of the charge stock. The process is of greatest value in processes in which the conditions of temperature and pressure for the reaction are sufficiently severe that heating of the charge stock to those conditions may result in coke formation. Examples of such processes are fluidized processes for cracking, hydrodesulfurization, hydrogenation and coking of heavy hydrocarbon fractions. For convenience, this invention will be described as used for the fluid catalytic cracking of heavy hydrocarbon charge stocks, and specifically for the cracking of full and reduced Kuwait crude oils.

The novel process of this system for charging hydrocarbons to fluidized processes can be used with any hydrocarbon charge stocks. In most instances, however, no difficulty is experienced in charging distillate hydrocarbons since they are ordinarily either in the vapor phase as charged or are vaporized substantially immediately upon admixture with the hot fluidized particles. This invention is of principal value in charging high boiling point hydrocarbons, especially heavy hydrocarbon fractions containing residual hydrocarbons having boiling points above the temperature employed in the conversion process or above temperatures to which the fractions may be heated without coking, to fluidized conversion processes. The term heavy hydrocarbons is used in this specification to designate such fractions of which full and reduced crude oils are examples.

The gas injected into the catalyst prior to admixture with the charge stock in the process of this invention can be any material in the gaseous state that does not interfere with or adversely affect the conversion reaction. Preferred gaseous materials are compressed gases from product recovery systems of refineries, since these gases are generally not affected at the conditions existing in catalytic cracking processes. These compressed gases can consist of pentane and lighter hydrocarbons, either alone or in addition to hydrogen. Still more preferably, the gases injected into the stream of catalyst particles prior to admixture with the charge stock are of even lighter hydrocarbons such as propane and hydrocarbons of lower boiling points and hydrogen. Naphthas and gaseous distillate gas oils can also be employed; however, these heavier distillate fractions ordinarily will be at least partially converted in the conversion reaction and the conditions employed in the conversion process are designed for the most efficient conversion of the high boiling point residual materials rather than the gas oils.

Hence, optimum product distribution will not be obtained from the gas oils if they are used to disperse the catalyst. Inert gases, such as nitrogen, can also be employed if available in a compressed condition suitable for injection into the fluidized solid particle stream.

In the usual fluid cracking process, a dense stream of regenerated catalyst is withdrawn from the regenerator through a standpipe and discharged as a dense relatively slow moving stream from the standpipe into a stream of charge stock in the transfer line to the reactor. When the charge stock is a heavy hydrocarbon of high boiling point, substantial quantities of liquid are present in high local concentrations. Particles of catalyst are wet with liquid, become sticky, and adhere to adjacent particles to form agglomerates of catalyst.

In this invention, the acceleration and dispersion gas is introduced into the stream of catalyst particles at any point prior to the mixing of the solid particles with the charge stock at which the gas will flow in the direction of movement of the catalyst particles. The preferred place for the introduction of gas is below the slide valve in the standpipe from the regenerator. The gas disperses the catalyst to form a relatively dilute phase traveling at high velocities as the catalyst is discharged into the transfer line. While this invention is not limited to any theory of its mechanism, it is believed that the catalyst is quickly carried past the point of mixing which prevents any single catalyst particle being overloaded with liquid. Moreover, the highly dispersed condition of the catalyst stream reduces agglomeration by increasing the distance between adjacent catalyst particles to permit absorption or cracking of liquid charge stock on the particles before collision with adjacent particles.

The amount of gas employed in the process of this invention will depend largely on the nature of the charge stock and the particular fluidized conversion process. For example, in catalytic cracking processes, the gas is introduced into the process in amounts ranging from 200 to 2500 standard cubic feet of gas per barrel of charge stock. The temperature of the gas introduced into the catalyst stream is determined by the heat requirements of the conversion reaction and the temperature of the regenerated catalyst and the charge stock. Regeneration of cracking catalysts is usually accomplished at a temperature in the range of about 950° to 1200° F. In the catalytic cracking process, for example, the mixture of gas and catalyst at the time of discharging into the transfer line is ordinarily at a temperature in the range of 950° to 1150° F. The heavy hydrocarbon charge stock in fluid catalytic cracking processes is usually at a temperature in the range of 400° to 800° F. prior to mixing with the regenerated catalyst.

An embodiment of apparatus suitable for fluid catalytic cracking of a heavy hydrocarbon according to this invention is illustrated in the drawings in which a heavy hydrocarbon charge stock is delivered from a supply line 10 into a preheater 12 in which the heavy hydrocarbon is heated to the temperature necessary for the heat balance of the unit, usually from 400° to 800° F. The charge stock is discharged from the preheater 12 into a feed line 14 which delivers the hot heavy hydrocarbon feed into a transfer line 16 opening into the lower end of a reactor 18.

Reactor 18 is provided with a perforated grid 20 extending across its lower end above the outlet of transfer line 16. Above the grid 20 is a dense phase fluidized bed 22 of catalyst particles suspended by the ascending charge stock and reaction products. The upper surface of the dense phase of fluidized bed 22 is indicated by reference numeral 24 in the drawings. Any of the conventional cracking catalysts such as natural or synthetic composites of silica and alumina and silica and magnesia, either alone or promoted with other metal oxides, can be used. The temperature in the reactor is in the range of 800° to 950° F.

Above the upper surface 24 of the fluid bed is a dilute phase of reaction products and entrained catalyst. The dilute phase discharges through separators 26 in which catalyst particles are separated from the gaseous reaction products and returned through standpipes 28 to the fluidized bed 22. The gaseous reaction products discharged from the separator 26 are delivered through a line 30 to product recovery apparatus, not shown.

During the course of the cracking reaction in reactor 18 carbonaceous deposits are formed on the surface of the catalyst. In order to maintain the activity of the catalyst a stream of catalyst is withdrawn through a stripper 32 and standpipe 34. A fluidizing and stripping gas is introduced into the standpipe 34 through a line 36 immediately above a slide valve 38 in the lower end of standpipe 34. Slide valve 38 permits control of the rate of withdrawal of catalyst from the reactor 18 through the standpipe 34.

Catalyst particles are discharged from the lower end of standpipe 34 into a transfer line 40 in which the catalyst particles are picked up by a stream of oxygen-containing gas, usually air or a mixture of air and recycled flue gases, introduced into the transfer line 40 from a supply line 41. The mixture of oxygen-containing gas and contaminated catalyst passes upwardly through transfer line 40 into the lower end of a regenerator 42.

A fluidized bed 44 of catalyst particles is suspended by the oxygen-containing gas and flue gases resulting from burning carbonaceous deposits on the catalyst particles. If desired, additional oxygen-containing gas for regeneration of the catalyst is introduced into regenerator 42 through a line 46. Gaseous combustion products pass upwardly out of the dense phase of the fluid bed 44 into a dilute phase above the upper surface 48 of fluidized bed 44. The gaseous combustion products and entrained catalyst pass through a separator 50 in which entrained catalyst particles are separated from the gaseous combustion products and returned to the fluid bed 44 through a leg 52. The gaseous combustion products are delivered from the regenerator 42 through a line 54 to a suitable stack, not shown.

A partition 56 in the regenerator 42 forms a well 58, through which regenerated catalyst is withdrawn from the fluidized bed 44. The lower end of the well 58 opens into the upper end of standpipe 60. A fluidizing gas is introduced into standpipe 60 through line 61 immediately above a slide valve 62 in the lower end of standpipe 60. Slide valve 62 permits control of the rate of withdrawal of regenerated catalyst from the regenerator 42 through the standpipe 60. The standpipe 60 extends below slide valve 62, and opens into a horizontal conduit 64 which curves upwardly and opens into transfer line 16.

In the embodiment of this invention described, a mixture of hydrocarbon gases containing hydrogen and pentane and lighter hydrocarbons is introduced through a line 66 into the conduit 64. The gases may be obtained from any source and preferably are recycled from the product recovery system of the refinery. The gases which are introduced into the system at a rate of from 200 to 2500 standard cubic feet per barrel of charge stock disperse and accelerate the catalyst particles whereby they are swept rapidly past the outlet of feed line 14 into transfer line 16.

The process of this invention permits the charging of heavy hydrocarbons having high boiling points to fluidized processes without the formation of coke and catalyst agglomerates in the transfer line. The following specific examples illustrate specific applications of this invention to catalytic cracking processes.

EXAMPLE I

A full Kuwait crude oil having the following inspection was charged at the rate of 20 pounds per hour and at a temperature of 575° F. to a fluid cracking pilot plant employing a commercial "natural" catalyst, Filtrol SR.

| | |
|---|---|
| Gravity, ° API | 29.7 |
| Distillation | ASTM D158 |
| Over point, ° F. | --- |
| 10% at ° F. | 288 |
| 30% | 466 |
| 50% | 637 |
| 70% | --- |
| 90% | --- |

Catalyst was recycled from the regenerator of the pilot plant to the reactor through the transfer line without the addition of gas to the catalyst prior to mixing with the feed stock. A catalyst to oil ratio of 13 to 1 in the feed to the reactor was employed. The catalyst temperature prior to contact with the feed stock was 1060° F. Coking of the transfer line and agglomeration of oil and catalyst in the transfer line made it necessary to terminate runs at the conditions described in from 8 to 20 hours.

EXAMPLE II

Runs in the same pilot plant were made at the same operating conditions and with the same feed stock described in Example I with the exception that prior to mixing the regenerated catalyst with the full Kuwait crude charge stock, gas consisting of hydrogen and pentane and lighter hydrocarbons were added to the catalyst stream at the rate of 1970 standard cubic feet per barrel of charge stock prior to mixture of the catalyst with the charge stock. The unit was operated for 60 hours without any indication of coking or agglomeration in the transfer line.

EXAMPLE III

A 49.9 percent reduced Kuwait crude having the following inspection was employed as a charge stock.

Charge stock:
- Position in crude, percent by vol. _____ 50.1–100.
- Gravity, ° API _____ 15.3.
- Distillation _____ Vacuum corrected.
  - Over point, ° F. _____ 373 to 760 mm. Hg.
  - 10% at ° F. _____ 704.
  - 30% _____ 818.
  - 50% _____ 941.
  - 70% _____ 1000.
  - 90% _____ ____

The reduced Kuwait crude was charged to the same fluid cracking pilot plant employed in Examples 1 and 2 at the rate of 20 pounds per hour and at a temperature of 576° F. Regenerated catalyst was added to the charge stock at a catalyst to oil ratio of 13 to 1 without the introduction of gas to the catalyst. The catalyst temperature prior to pickup with the charge stock was 1060° F. Runs of only 20 to 30 minutes' duration were possible before coking and agglomeration in the transfer line prevented further operation.

EXAMPLE IV

A sample of the reduced Kuwait crude oil employed in Example III was cracked at the conditions described in Example III with the exception that a gas consisting of hydrogen and pentane and lighter hydrocarbons was added to the regenerated catalyst stream at the rate of 1970 standard cubic feet per barrel of charge prior to mixing the regenerated catalyst with the charge stock. Runs of 40 and 69 hours' duration were obtained without any catalyst stoppages due to agglomeration of catalyst in the transfer line.

EXAMPLE V

A gasoline-free Baxterville, Mississippi, crude oil was passed through the reactor at a space velocity of 10 pounds of oil per pound of catalyst per hour. The temperature of the reactor was maintained at 920° F. Regenerated catalyst at a temperature of 1070° F. was added in the transfer line to the reactor to the reduced Baxterville charge stock in the ratio of 20 pounds of catalyst per pound of charge stock. No gas was added to the regenerated catalyst before it was mixed with the the charge stock. Agglomeration of catalyst in the transfer line made it necessary to stop the run in slightly less than one-half hour.

The operating conditions and the results of the experimental runs are set forth in the following Table I.

*Table I*

| Example | I | II | III | IV | V |
|---|---|---|---|---|---|
| Charge stock | Kuwait crude | Kuwait crude | reduced Kuwait | reduced Kuwait | reduced Baxterville |
| Space velocity, lb./hr./lb. | 5.4 | 5.4 | 5.4 | 5.4 | 10.0 |
| Reactor temp., ° F. | 925 | 926 | 925 | 927 | 920 |
| Regenerator temp., ° F. | 1,075 | 1,074 | 1,075 | 1,085 | 1,070 |
| Catalyst to oil ratio, lb./lb. | 13 | 13 | 13 | 13 | 20 |
| Gas addition, s.c.f./bbl. charge | 0 | 1,970 | 0 | 1,970 | 0 |
| Run duration, hrs. | 8–20 | 60 | ½ | 40–69 | ½ |

Although operations were not continued for more than 60 or 69 hours in Examples II and IV, previous experience has shown that trouble-free plant operations of this duration are sufficient to predict successful commercial operation. Thus, all of the experimental runs described above in which gas was added to the catalyst give results which will allow operation of commercial units, while the results of those runs in which gas was not injected into the catalyst stream before mixing with the charge stock show that commercial operations without the injection of gas would not be feasible.

What I claim is:

1. In a fluidized process for the conversion of heavy hydrocarbon oils containing residual fractions having boiling points above the conversion temperatures in which a dense phase fluidized stream of hot, finely divided particles is withdrawn from a fluidized bed in a reaction vessel, passed downwardly through a standpipe having a slide valve therein for control of the rate of withdrawal, discharged into a transfer line below the slide valve, the heavy hydrocarbon oil is introduced into the stream of hot particles in the transfer line, and a dispersed, dilute phase of the mixture of hydrocarbon oil and finely divided particles is delivered upwardly through the transfer line to a fluidized bed in a reactor, the improvement comprising injecting into the dense phase stream of finely divided particles discharged into the transfer line prior to introduction of the hydrocarbon oil a gas substantially inert to the conditions in the reactor to disperse the particles in a dilute phase and carry them at a high velocity toward the reactor past the point of introduction of the heavy hydrocarbon oils.

2. A process as set forth in claim 1 in which the conversion process is a catalytic cracking process, the particles are cracking catalyst particles, and the rate of injection of the gas is about 200 to 2500 standard cubic feet per barrel of hydrocarbon oil.

References Cited in the file of this patent

UNITED STATES PATENTS

| | | |
|---|---|---|
| 2,435,158 | Read | Jan. 27, 1948 |
| 2,575,258 | Corneil et al. | Nov. 13, 1951 |
| 2,584,378 | Beam | Feb. 5, 1952 |
| 2,587,670 | Weinrich | Mar. 4, 1952 |
| 2,589,124 | Packie | Mar. 11, 1952 |
| 2,655,466 | Gohr et al. | Oct. 13, 1953 |
| 2,700,015 | Joyce | Jan. 18, 1955 |
| 2,732,330 | Krebs et al. | Jan. 24, 1956 |